US009009615B2

(12) United States Patent
Yu et al.

(10) Patent No.: US 9,009,615 B2
(45) Date of Patent: Apr. 14, 2015

(54) PORTAL FOR SUBMITTING BUSINESS METADATA FOR SERVICES

(71) Applicant: Microsoft Corporation, Redmond, WA (US)

(72) Inventors: Yen Ping Yu, Bothell, WA (US); Mudit Mittal, Bellevue, WA (US); Syed Hamid, Redmond, WA (US); Satish Joseph Thomas, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 13/654,407

(22) Filed: Oct. 17, 2012

(65) Prior Publication Data

US 2014/0108975 A1 Apr. 17, 2014

(51) Int. Cl.
*G06F 3/048* (2013.01)
(52) U.S. Cl.
CPC ........................ *G06F 3/048* (2013.01)
(58) Field of Classification Search
None
See application file for complete search history.

(56) References Cited

U.S. PATENT DOCUMENTS

| 7,885,918 | B2 | 2/2011 | Statchuk | |
|---|---|---|---|---|
| 8,073,863 | B2 | 12/2011 | Rachmiel et al. | |
| 2005/0138606 | A1* | 6/2005 | Basu et al. | 717/136 |
| 2005/0228803 | A1* | 10/2005 | Farmer et al. | 707/100 |
| 2006/0277163 | A1 | 12/2006 | Schemer et al. | |
| 2010/0319002 | A1* | 12/2010 | Gosain et al. | 719/311 |
| 2010/0333069 | A1* | 12/2010 | Chandra et al. | 717/126 |
| 2011/0209045 | A1 | 8/2011 | Ghosh et al. | |
| 2011/0283269 | A1* | 11/2011 | Gass et al. | 717/168 |
| 2011/0283270 | A1* | 11/2011 | Gass et al. | 717/168 |
| 2011/0296391 | A1* | 12/2011 | Gass et al. | 717/168 |
| 2012/0005751 | A1 | 1/2012 | Chen et al. | |
| 2012/0017280 | A1 | 1/2012 | Wiegenstein et al. | |
| 2012/0159369 | A1 | 6/2012 | Nayak et al. | |
| 2013/0179867 | A1* | 7/2013 | Fitterer et al. | 717/130 |
| 2013/0291127 | A1* | 10/2013 | Bergman et al. | 726/30 |

OTHER PUBLICATIONS

"Business Analytics", Retrieved at <<http://www.windowsazure.com/en-us/home/features/business-analytics/>>, Retrieved Date : Aug. 22, 2012, p. 2.
Kanaracus, Chris, "Microsoft moves Dynamics ERP to Azure cloud", Retrieved at <<http://news.techworld.com/applications/3273514/microsoft-moves-dynamics-erp-to-azure-cloud/>>, Apr. 12, 2011, p. 4.
"Metadata services introduction", Retrieved at <<http://publib.boulder.ibm.com/infocenter/iisinfsv/v8r0/index.jsp?topic=/com.ibm.swg.im.iis.productization.iisinfsv.overview.doc/topics/cisomsintro.html>>, Retrieved Date : Aug. 22, 2012, p. 2.
Search Report and Written Opinion for International Application No. PCT/US2013/065520, date of mailing: Jul. 25, 2014; date of filing: Oct. 17, 2013. 10 pages.

* cited by examiner

*Primary Examiner* — Matt Kim
*Assistant Examiner* — Hua Lu
(74) *Attorney, Agent, or Firm* — Damon Rieth; Jim Ross; Micky Minhas

(57) ABSTRACT

A user interface display provides access to an analysis portal that receives customized code for a business data system. The code is provided through the user interface display to a cloud based service that analyzes the customized code based on the types of services requested by the user. A report is generated, based on the analysis, and displayed to the user.

16 Claims, 18 Drawing Sheets

400 →

| Metrics | Value |
|---|---|
| Performance Metric | 4 |
| Upgrade Metric | 1 |
| Quality Metric | 10 |

← 410

| Tables | Count |
|---|---|
| Modified Tables | 2 |
| New Tables | 2 |
| Number of Warnings | 5 |
| Number of Errors | 1 |

← 412

| Classes | Count |
|---|---|
| Modified Classes | 0 |
| New Classes | 1 |
| Number of Warnings | 0 |
| Number of Errors | 0 |

| Forms | Count |
|---|---|
| Modified Forms | 0 |
| New Forms | 0 |
| Number of Warnings | 0 |
| Number of Errors | 0 |

| Enums | Count |
|---|---|
| Modified Enums | 2 |
| New Enums | 0 |
| Number of Warnings | 1 |
| Number of Errors | 0 |

FIG. 3B

PORTAL FOR SUBMITTING BUSINESS METADATA FOR SERVICES

BACKGROUND

There are a wide variety of different types of business data systems currently in use. Such systems often include enterprise resource planning (ERP) systems, customer relations management (CRM) systems and line-of-business (LOB) applications, among others.

In deploying a business data system within a business, an independent service vendor (ISV) or developer often takes the initial business data system and modifies, or customizes, it to the particular needs of the company. For instance, a developer may customize the code or metadata or both in the business data system so that it meets the particular needs of a given company.

During this type of development, the developer may wish to ensure that the customizations that are being made conform to the best practices for the specific business data system. In addition, the developer may wish to have the customizations analyzed to determine whether they are generating errors, or other problems with the deployment. It is currently quite cumbersome to obtain this type of analysis. In fact, a comprehensive analysis of the customizations is not normally obtainable at all.

Additionally, in order to obtain any type of analysis of a customization, the developer often sends the customized code to the analyzer (which may be the manufacturer of the underlying business data system that was customized by the developer) and requests an analysis. The customized code is then run locally by the analyzer. The analyzer may run different types of automated checks on the customized code and perform some manual tests and then provide fairly limited feedback. The feedback can include general feedback as to the accuracy of the customized code, as to whether it will cause errors, as to whether it conforms to best practices established by the analyzer, etc. In addition, to being limited, this type of analysis can take hours or even days. In the interim, the developer does not know the results of the analysis.

It has also been difficult, with conventional business data systems, for the research and development team that designed the business data system to obtain information about how customers are using the product and to update best practices as they are developed. For instance, it is very difficult, if not impossible, to obtain aggregated data that illustrates how a plurality of different customers and partners are customizing the product. Currently, in an attempt to obtain this information, the research and development team conducts time consuming and costly human interviews with various customers. These interviews attempt to obtain data from the customer about how the customer customized the product, how the product is being deployed, etc. In addition, the research and development team can sometimes obtain a copy of the customized code from the customer (for a one-time use) for analyzing the code. The research and development team then normally needs to write additional code to run an analysis on the customer file. In the end, this only provides information about a single customer. It has been very difficult and cumbersome, if not impossible, to view aggregated data about how customers and partners customize the product. Therefore, the research and development team normally does not fully leverage this information, from a large cross section of customers, in generating new releases and additional features for the underlying product.

The discussion above is merely provided for general background information and is not intended to be used as an aid in determining the scope of the claimed subject matter.

SUMMARY

A user interface display provides access to an analysis portal that receives customized code for a business data system. The code is provided through the user interface display to a cloud based service that analyzes the customized code based on the types of services requested by the user. A report is generated, based on the analysis, and displayed to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3B-3D show illustrative user interface displays of reports.

DETAILED DESCRIPTION

Figure 1:
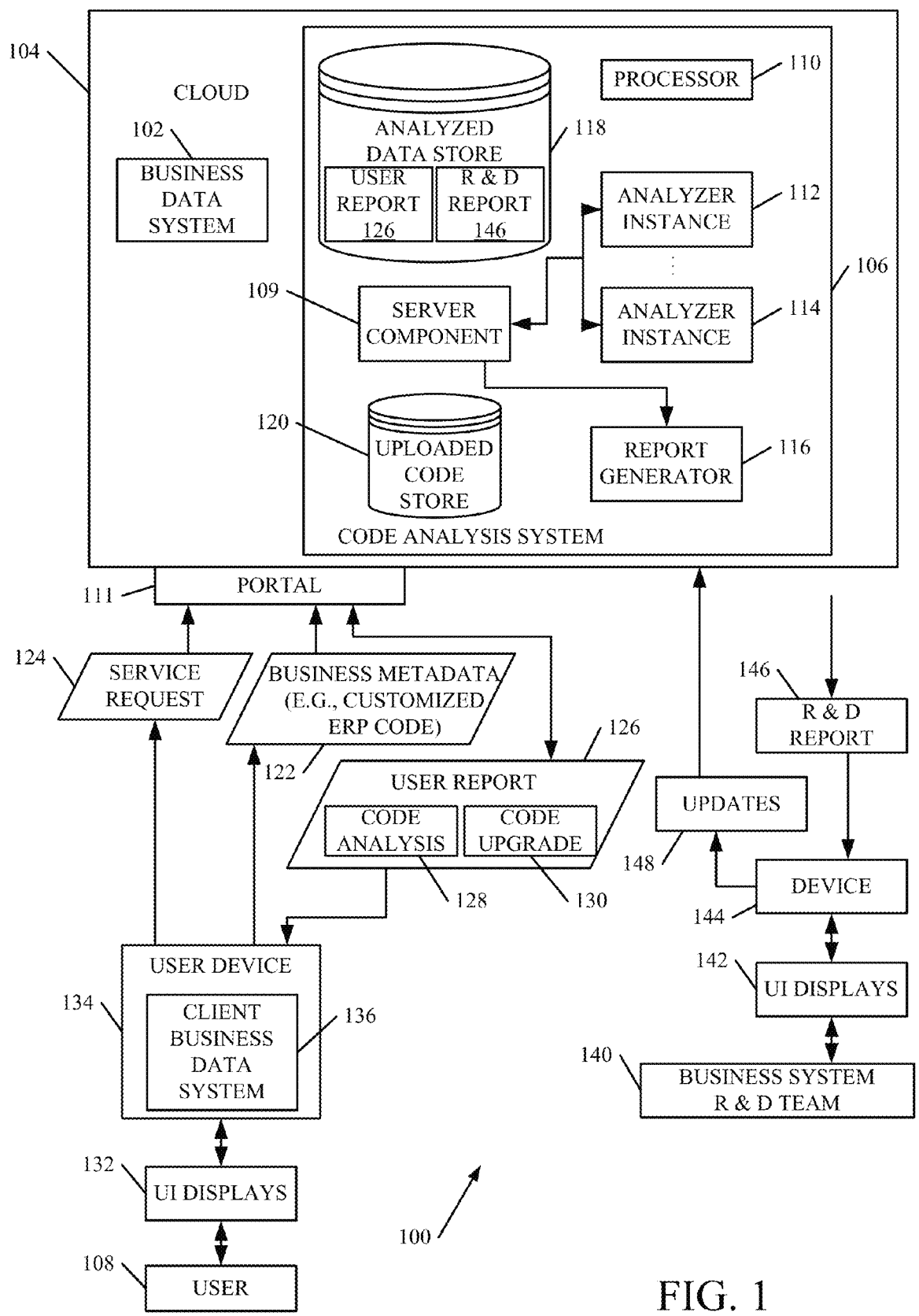
FIG. 1 is a block diagram of a code development system.

FIG. 1 is a block diagram of a code development system 100 that includes business data system 102 deployed as a service within cloud 104. System 100 also includes code analysis system 106 that is also deployed as a service within cloud 104. Cloud 104 (that is, itself, described in greater detail below with respect to FIG. 5) is accessible by user 108 which can be a developer, an independent service vendor (ISV) or another user that wishes to customize code used in business data system 102. User 108 accesses system 106 through a web based portal 111. The code can be used to implement a variety of different types of business data systems, such as an enterprise resource planning (ERP) system, a customer relations management (CRM) system, a line-of-business (LOB) application, etc. It will be discussed herein as an ERP system, but it will be understood that this is by way of example only.

FIG. 1 shows that user 108 can access code analysis system 106 through user device 134 (which can implement a client-based business data system 136) by interacting with user interface displays 132 (which can be a web page or a page generated by an application native to device 134). It will be noted that, in one embodiment, user interface displays 132 include user input mechanisms (such as buttons, links, dropdown menus, text boxes, etc.) that allow user 102 to provide inputs to, and manipulate, business data system 102 or client-based business data system 136, or both. User 108 can provide these user inputs using a variety of different user input devices, such as a point and click device (e.g., a mouse or track ball), hardware or software keyboards or keypads and voice, etc. Also, where the display device displaying UI displays 132 is a touch sensitive screen, the user can also provide these inputs using touch gestures with the user's finger, a stylus, or other input device. These are given by way of example only.

FIG. 1 also shows that the business system research and development (R & D) team 140 illustratively accesses code analysis system 106, through user interface displays 142 that can be generated by a suitable device 144. R & D team 140 can receive R & D reports 146 which are generated by code analysis system and aggregated for a plurality of different customers. This provides R & D team 140 with valuable information for generating updates 148, bug fixes, or other modifications to the business data system 102 in cloud 104, or otherwise.

Before describing the operation of system 100 in more detail, code analysis system 106 will first be briefly described. FIG. 1 shows code analysis system 106 displayed in cloud 104 and accessible through a web-based portal. However, the code can also be analyzed by, or accessed through a code analysis system 106 resident on user device 134. If analyzed on device 134, the results of the analysis can then be uploaded or otherwise made accessible to R & D team 140. However, for the sake of example, the present description proceeds with respect to code analysis system 106 deployed in cloud 104. This is exemplary only.

FIG. 1 shows that code analysis system 106 includes server component 109, processor 110, analyzer instances 112-114, report generator 116, analyzed data store 118 and uploaded code store 120. It should be noted that processor 110 is illustratively a computer processor with associated memory and timing circuitry (not separately shown). Processor 110 is illustratively a functional part of system 106 and is activated by, and facilitates the functionality of, the analyzers 112-114, report generator 116, server component 108, server component 109, and other items in system 100. It should also be noted, of course, that while processor 110 is shown as a single processor, there may be multiple processors incorporated into the other items in system 106. Similarly, there can be separate processors on devices 134 and 144 as well, and they may be similar to processor 110, although they are not described in detail herein. Also, it should be noted that data stores 118 and 120 can be a single data store or multiple different data stores. Similarly, they can both be provided on cloud 104, or they can be located remotely and accessed through cloud 104, or otherwise, as well. Component 109 is illustratively a web server that provides the services of code analysis system 106 to user 108 and R & D team 140. Analyzer instances 112 and 114 are illustratively different instances of an analyzer so that customized code for more than one user can be analyzed at the same time. Of course, there need not be multiple different analyzer instances, but two are shown for the sake of example.

Before describing the operation of system 100 in detail, a brief overview will first be provided. Code analysis system 106 receives customized metadata or customized code or both (hereinafter referred to as customized ERP code 122 or customized code 122) and a request 124 for an analysis service to be performed by system 106 from user 108. System 106 then performs the requested analysis on the customized code 122 and returns a user report 126 that provides a code analysis 128, optionally code upgrades 130, and other information. User 108 customizes the code 122, requests a code analysis and views the reports, illustratively through user interface displays 132 that are generated by a user interface component on user device 134. In order to customize the code, user 108 can do the customizations on client-based business data system 136 (such as a client version of the ERP system 102) or by providing inputs to cloud-based business data system 102. In the latter case, the ERP system is offered as a cloud-based service and user 108 customizes the code by accessing the service in cloud 104.

Figure 2:
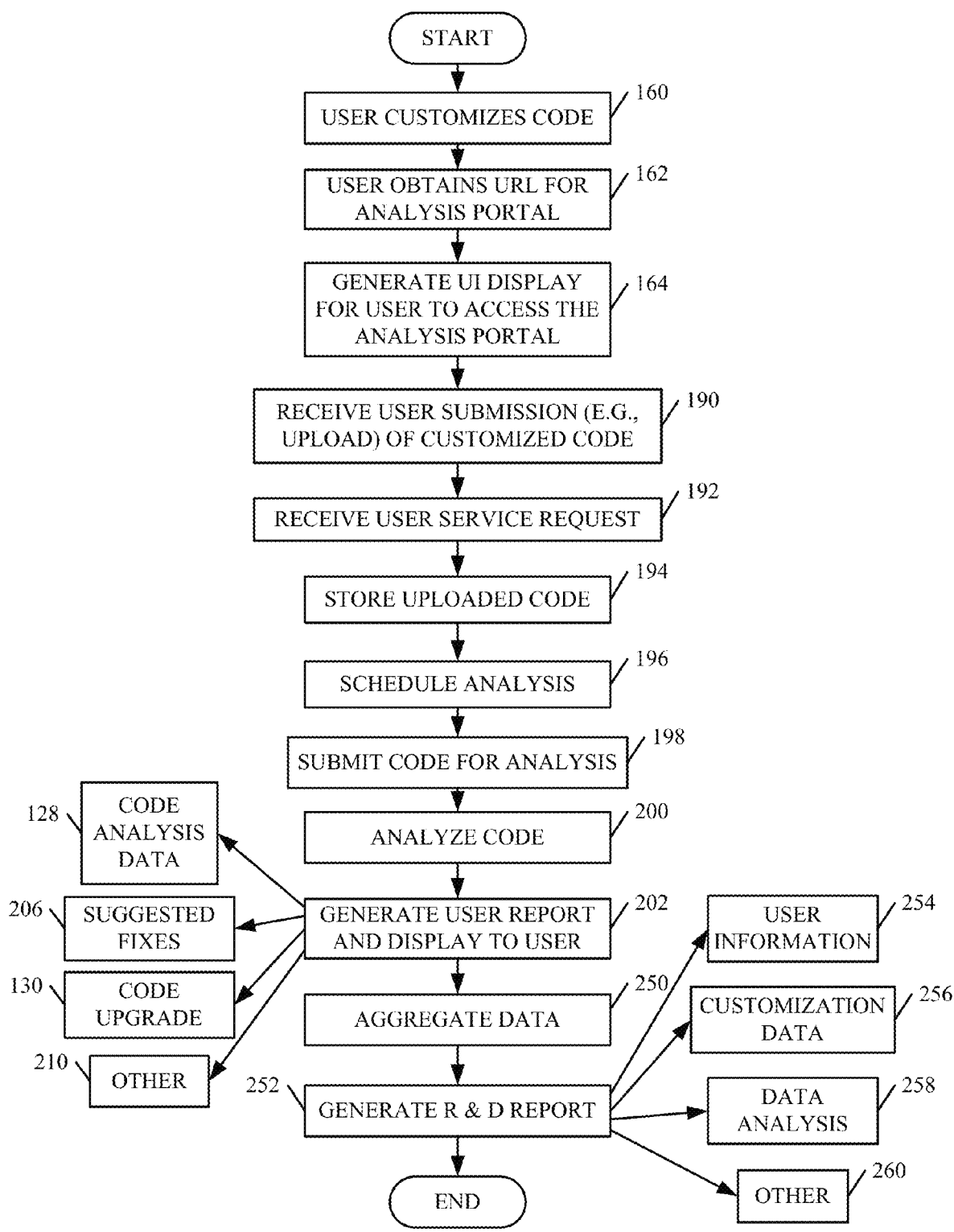
FIG. 2 is a flow diagram illustrating one embodiment of the overall operation of the system shown in FIG. 1.

FIG. 2 is a flow diagram illustrating, in more detail, one embodiment of the overall operation of system 100, shown in FIG. 1, in receiving customized code 122 and generating user report 126 and R & D report 146. User 108 first customizes the metadata corresponding to the business data system. By way of example, the user customizes metadata in the ERP code for the ERP system being deployed to obtain customized ERP code 122. This is indicated by block 160 in FIG. 2. Next, user 108 obtains a uniform resource locator (URL) for a web-based analysis portal 111 that provides user 108 with access to code analysis system 106 in cloud 104. This is indicated by block 162 in FIG. 2.

When the user accesses the URL, code analysis system 106 (and in one specific embodiment, server 109) illustratively generates a user interface display provided through device 136 as a user interface display 132 to user 108. The user interface display illustratively allows user 108 to access the analysis portal 111 to select from a variety of different code analysis services that can be performed on customized code 122. This is indicated by block 164 in FIG. 2.

Figure 2A:
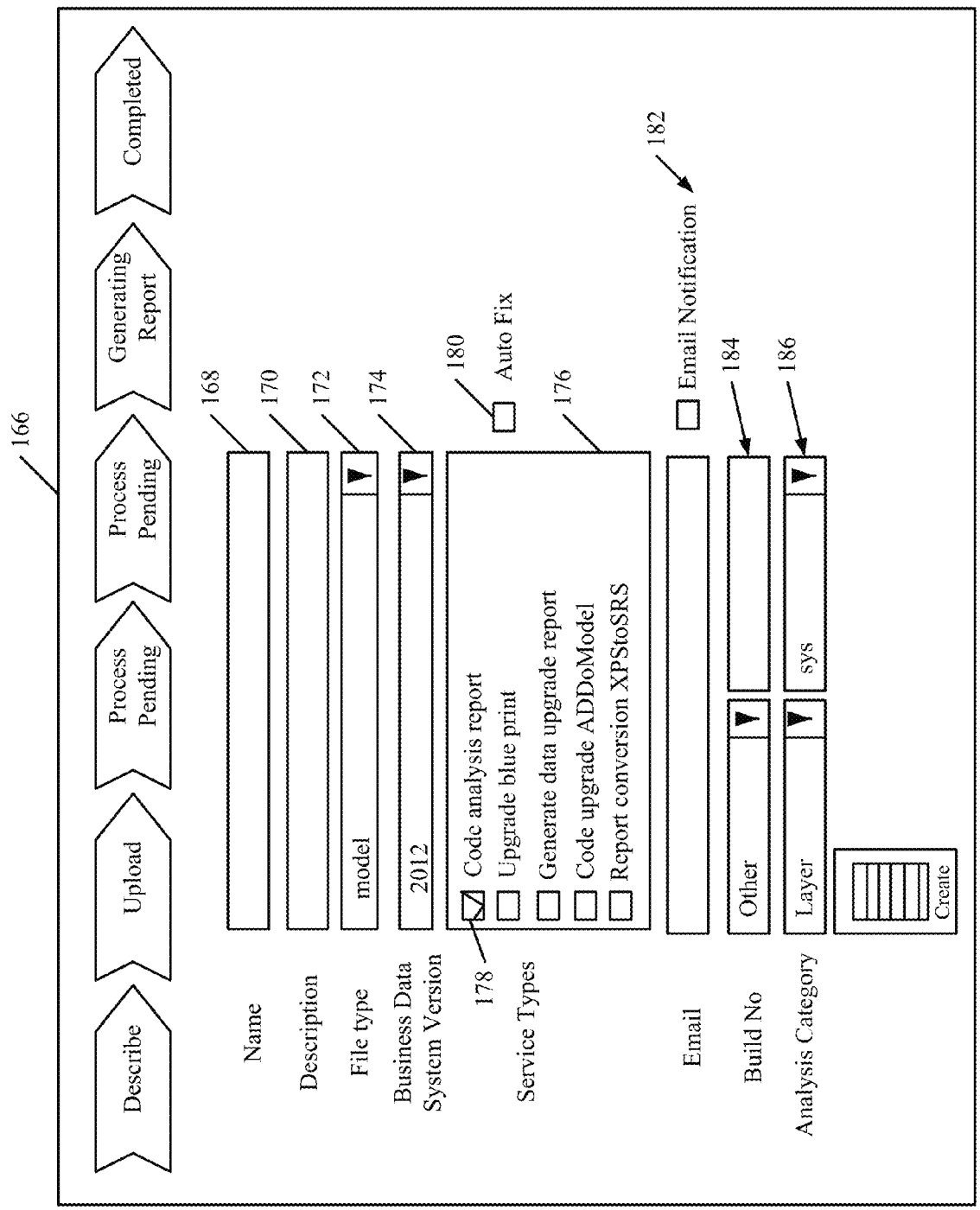
FIGS. 2A-2C illustrate various embodiments of user interface displays.

FIG. 2A shows one embodiment of a user interface display 166, which can allow user 108 to do this. It can be seen that user interface display 166 illustratively includes a name field 168, and a description field 170. Name field 168 allows user 108 to name the file (or customized code 122) that is being uploaded to system 106 for analysis. Description field 170 illustratively allows user 108 to enter text to describe the customized code.

User interface display 166 also illustratively has a model selector drop down box 172. This allows user 108 to select (from a dropdown menu) the specific type of business data model that the user has customized and is submitting for analysis. User interface display 166 also illustratively includes a version user input mechanism 174 that allows user 108 to input the version of the particular business data system (e.g., the ERP system) that is being customized and deployed by user 108. In the embodiment shown, user input mechanism 174 is illustratively a dropdown box which, when actuated by the user, generates a display of a dropdown menu that allows the user to select the particular version of the business data system being customized.

User interface display 166 is also shown with user input mechanism 176 that allows the user 108 to select the type of service that the user desires. The web-based portal 111 thus allows user 108 to select from a variety of different analysis services offered by system 106. For instance, the user 108 can simply have the customized code analyzed and receive an analysis report. This is selected by checking check box 178 in the embodiment shown in FIG. 2A. Of course, in one embodiment, user 108 can select various other services in addition to, or instead of, the service selected at 178. Those can include receiving an upgraded blue print for the customized code, automatic generation of a data upgrade script, receiving a code upgrade to upgrade the code itself, execution of a report conversion service which converts the report into one of a variety of different formats, etc. It will be noted that the service types listed in user input mechanism 176 are illustrative only, and additional services, or different services, could be provided as well.

User interface display 166 also includes user input mechanism 180 which allows the user to request automatic fixes to the customized code 122 that is submitted for analysis. In other words, if system 106 identifies errors in the code, it may be able to automatically fix the errors. By selecting check box 180, user 108 can select this service as well.

User interface display 166 also allows the user to provide an email address and select email notification using user input mechanism 192. Thus, the user 108 will receive email notifications as to the status of the analysis or other services being performed. Similarly, the user can identify the build or provide other identifying information generally at 184. Finally, as shown in user interface display 166, the user can specify one or more analysis categories for the customized code. This is indicated generally at block 186. For instance, in the embodiment shown at FIG. 2A, the user has selected the "layer" and "system" analysis categories using user input mechanism 186.

Referring again to FIG. 2, receiving the user submission (e.g., upload) of the customized code 122 is indicated by block 190 in FIG. 2. While the illustrative embodiment shows that this can be done using user interface display 166 in FIG. 2A, it can of course, be done in a variety of other ways as well. Receiving the user service request (that is, receiving the user input that identifies the types of services requested) is indicated by block 192 in FIG. 2.

Once the customized code 122 is uploaded from user 108, and the service request 124 is received, the code is stored by server component 109 in uploaded code store 120. This is indicated by block 194 in FIG. 2. Server component 109 illustratively adds the uploaded code to a queue and schedules analysis of the code, based upon the requested services, with one of a plurality of different analyzer instances 112-114. Scheduling the analysis is indicated by block 196 in FIG. 2. In one embodiment, server component 109 schedules the code for analysis using load balancing techniques so that additional analyzer instances 112-114 are instantiated, and retired, as needed. This allows a plurality of different users to submit customized code at the same time, and those different submissions can be analyzed simultaneously by the various analyzer instances 112-114, in a load balanced way.

Server component 109 then submits the uploaded code 122 for analysis to a given analyzer instance 112-114. This is indicated by block 198 in FIG. 2. The given analyzer instance (in the present embodiment the given analyzer instance is analyzer instance 112, for the sake of discussion) analyzes the code, as requested by the user 108 in the service request 124. This is indicated by block 200 in FIG. 2. A more detailed discussion of how analyzer instance 112 analyzes the customized code is described below with respect to FIGS. 3 and 3A. Suffice it to say, for now, that the level of analysis can be as deep as desired. The criteria or rules for analysis can be user defined or predefined and simply selected by the user.

As the code is being analyzed, report generator 116 illustratively generates user report 126 so that it can be viewed by user 108. This is indicated by block 202 in FIG. 2. In one embodiment, report generator 116 includes code analysis data 128 indicating various problems or difficulties that the customized code may encounter or errors that it may generate. It also illustratively identifies whether the code meets best practices criteria. In one embodiment, the user report can also report suggested fixes 206. That is, analyzer instance 112 can not only identify what errors may occur, but suggest how to fix a given code item in order to eliminate the error. The report can also illustratively include code upgrades 130 that are automatic upgrades available for the given code. Similarly, the user report can include a variety of other data 210.

Report generator 116 can illustratively generate intermittent reports (or can show displays illustrating detailed progress or percent completion based on actual code artifacts it has left to analyze), even before analyzer instance 112 has completely analyzed the customized code 122 submitted by user 108. Therefore, user 108 can access the intermittent reports through the web-based portal and begin to react to the analysis even before the analysis is complete. In this way, user 108 can begin revising and fixing the customized code 122 without having to wait until analyzer instance 112 has performed an entire analysis on the customized code. In one embodiment, as report generator 116 is generating the user report 126, it places the partially created user report 126 in analyzed data store 118 and provides a status report showing that intermittent results are available and how much of the analysis has been completed. Therefore user 108 can access the report (either the final report or an intermittent report) 126 through web-based portal 111, using user device 134. Similarly, user 108 can illustratively access a summary of the code analysis, which can also be generated by report generator 116 and placed in analyzed data store 118 as part of user report 126, or separately therefrom.

Figure 2B:
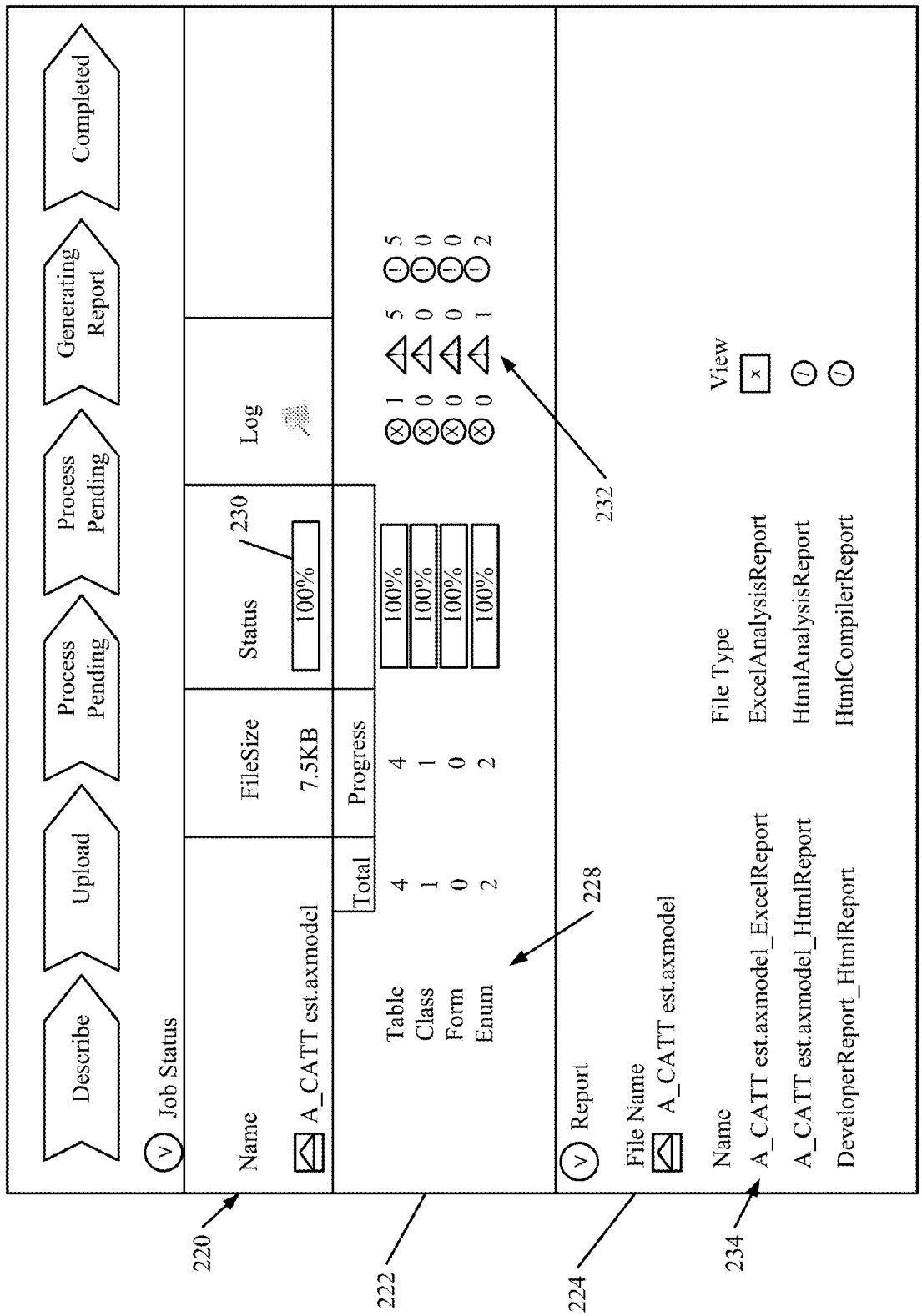

FIG. 2B shows one embodiment of a user interface display 220 that shows a summary of a report. User interface display 220 includes a job status portion 222 and a report portion 224. Job status portion 222 includes the name of the customized code 122 that is being analyzed at 226, along with a summary of the analyzed code at 228, and a status indicator 230 indicating the status of the code analysis. Summary portion 222 also includes a summary indicator section 232 that shows various number of errors, warnings, etc. that are associated with each portion of the customized code 122 (and identified by name 226) that is being analyzed.

Report section 224 illustratively contains links to the report 126 in different formats. In the embodiment shown in FIG. 2B, the reports 126 are shown generally at 234 and includes a spreadsheet format, a first HTML report, and a developer HTML report.

As briefly described below, the reports generated by report generator 116 can vary based on who is to view the reports. A developer may find a certain type of detail in a report helpful, while a project manager may not need that level of detail, or find it helpful. Therefore, report generator 116 can generate the user report 126 in various forms, highlighting or including different information that has been analyzed, based upon the intended consumer of the report.

In any case, analyzer instance 112 also illustratively aggregates the analyzed data. This is indicated by block 250 in FIG. 2. The aggregated data can be aggregated with analyzed data that is analyzed from customized code submitted by other users. In this way, the business system R & D team 140 can obtain useful information about how various customers are modifying or otherwise customizing the code for the business system. This can assist R & D team 140 in generating upgrades, fixing problems, or otherwise revising, or developing the code. Report generator 116 thus generates the R & D report 146 which includes the aggregated data. Generating the R & D report 146 is indicated by block 252 in FIG. 2.

Figure 2C:
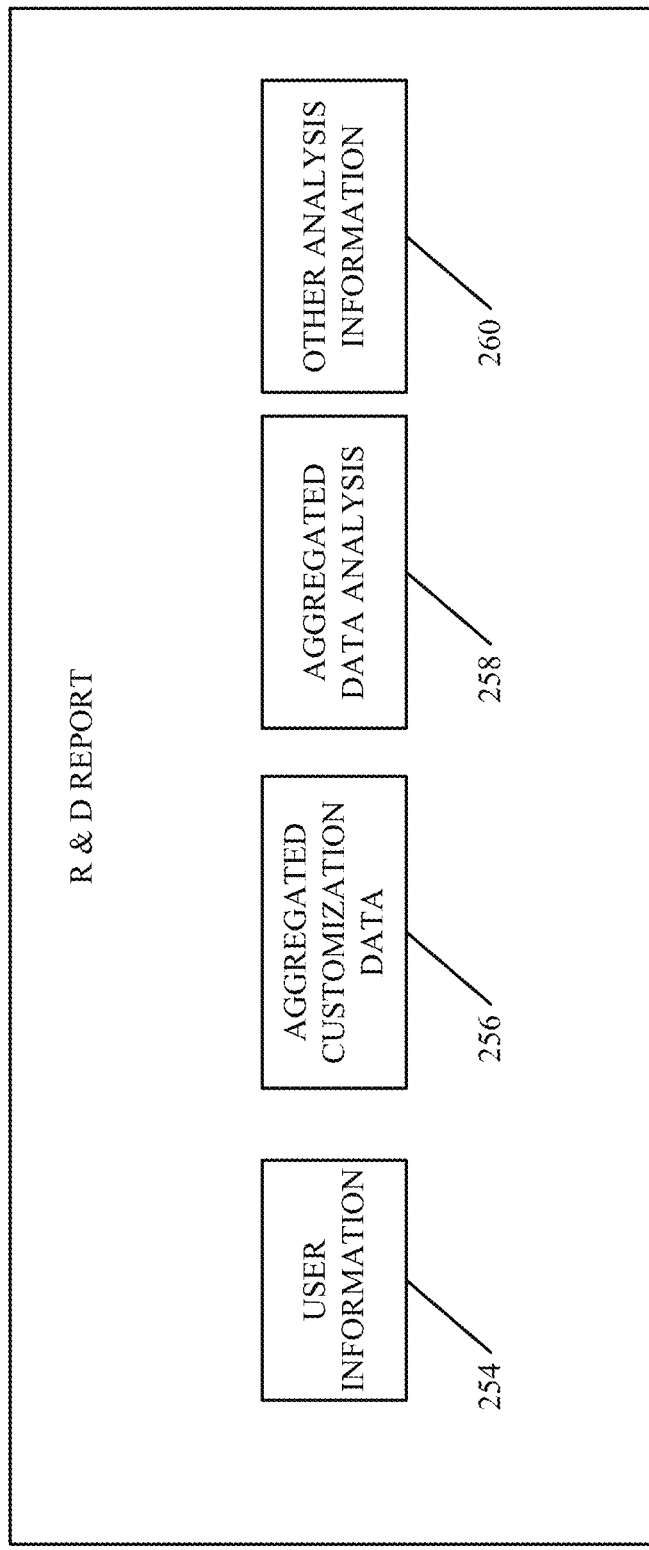

FIG. 2C is one illustrative user interface display that shows a block diagram of one illustrative R & D report 146. It can be seen that the R & D report 146 can include customer information 254, aggregated customization data 256, aggregated data analysis 258 and other analysis information 260.

User information 254 is illustratively information that identifies the type of user 108 that has submitted the customized code. For instance, if the customer is a developer, an independent service vendor, a manufacturer, etc., R & D team 140 may find this information useful when viewing the R & D report 146.

Customization data 256 illustratively highlights how the user has customized the business system code (e.g., the metadata) for the user's own implementation. It can also help R & D team 140 to identify how customers are using the business data system code.

Data analysis 258 is illustratively aggregated data that shows the results of the analysis performed by analyzer instance 112 on the various items of customized code that have been submitted for analysis. This may be similar information to that provided in user report 126, except that it is aggregated for a plurality of different users. Of course, it could be different data, it could include additional data, or it could include less data, as well.

Figure 3:
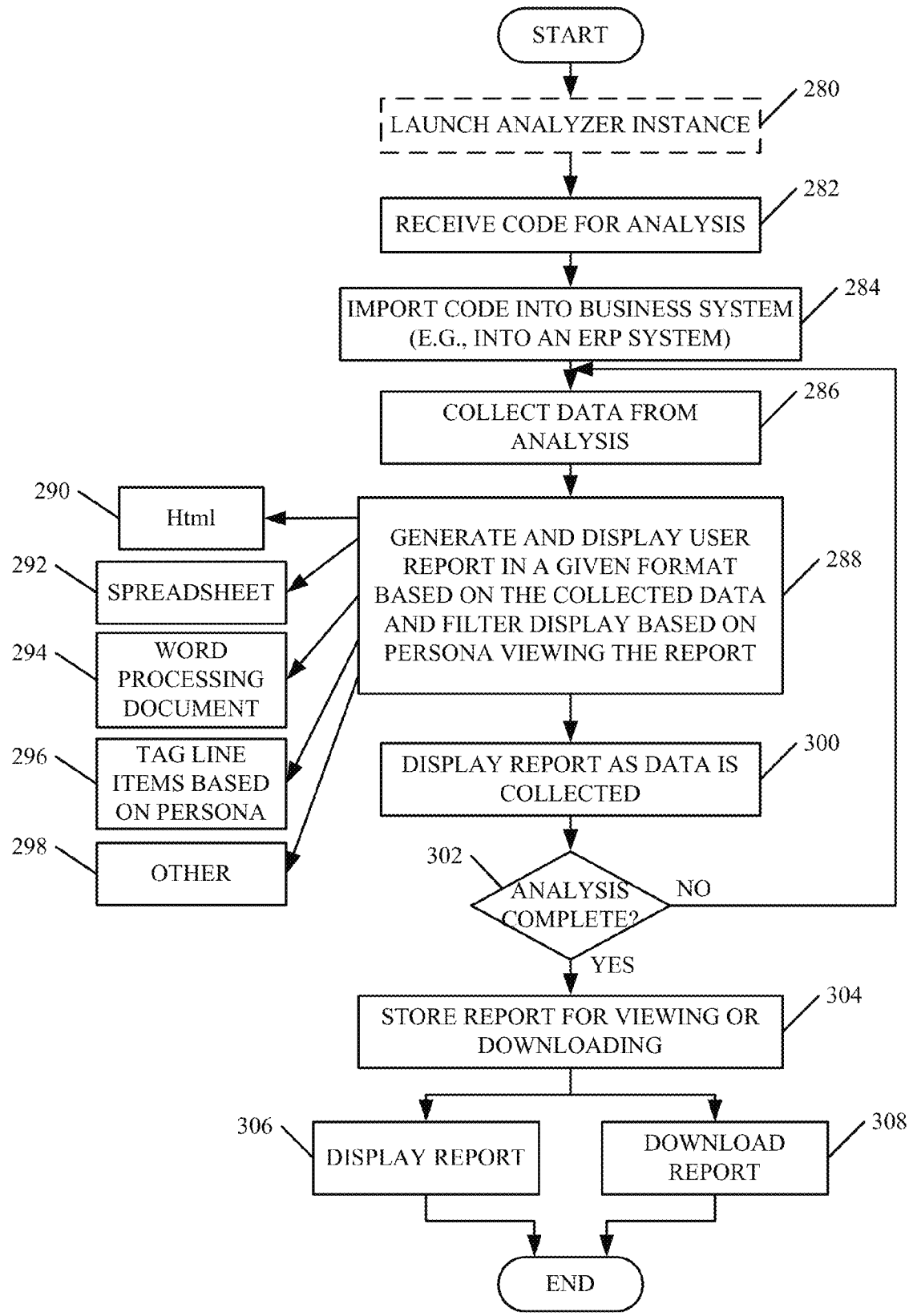
FIG. 3 is a flow diagram illustrating one embodiment of the operation of the system shown in FIG. 1 in analyzing code.
Figure 3A:
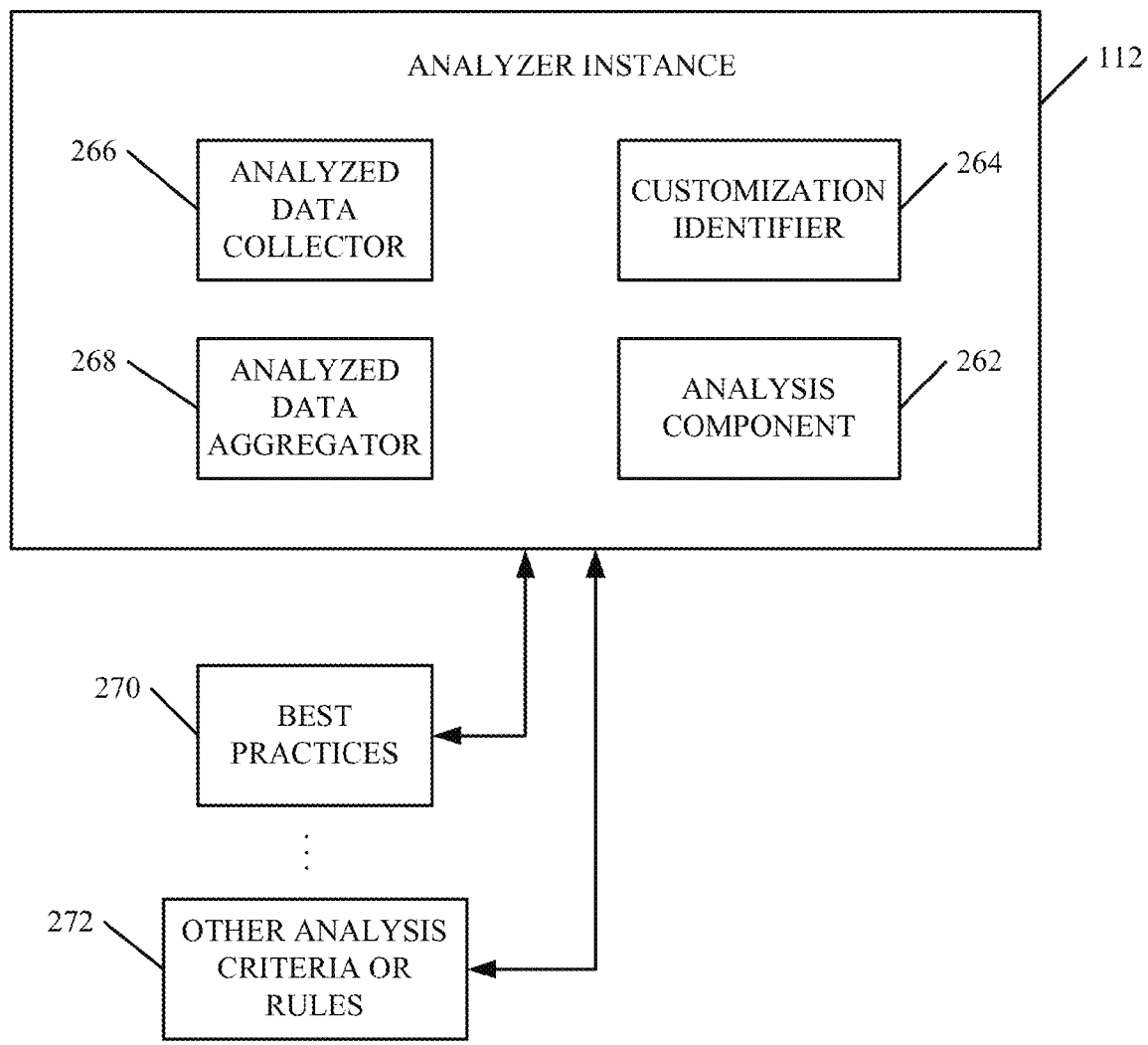
FIG. 3A is a block diagram of one illustrative analyzer instance.

FIG. 3 is a flow diagram illustrating one embodiment of the operation of an analyzer instance (such as analyzer instance 112) in analyzing the customized code 122 submitted by user 108. FIG. 3A is a block diagram showing one embodiment of analyzer instance 112 in more detail. Analyzer instance 112 illustratively includes analysis component 262, customization identifier 264, analyzed data collector 266 and analyzed data aggregator 268. In the embodiment shown in FIG. 3A, analysis component 262 illustratively performs the actual analysis operations on the customized code. This can take a wide variety of forms. For instance, the analysis component 262 can access best practices rules 270 and other analysis criteria or rules 272 and run operations or perform other tasks using the customized code 122 based on the best practices 270 and other analysis criteria or rules 272, in order to analyze the operation of the customized code. Customization identifier 264 identifies the particular customizations that have been made to the business system code (or metadata), in the customized code 122 being analyzed. Analyzed data collector 256 collects the results of the analysis performed by analysis component 262 so that they can be used by report generator 116 in generating user report 126 and R & D report 146. Similarly, analyzed data aggregator 268 aggregates the analyzed data, optionally with analyzed data from analysis performed for other customized code 122, so that it can be used by report generator 116 in generating R & D report 146.

A more detailed operation of analyzer instance 112 is now described with respect to FIG. 3. Server component 109 first identifies which analyzer instance 112-114 is to receive the customized code 122, from uploaded code store 120. In one embodiment, server component 109 does this in a load balanced way so that it can launch or retire additional analyzer instances, as needed. This is indicated by block 280 in FIG. 3. Block 280 is shown in dashed lines, because it is optional (such as where there is only one analyzer instance). In any case, server component 109 identifies analyzer instance 112 as the instance to receive the customized code 122. The analyzer instance 112 then receives the customized code 122 for analysis. This is indicated by block 282 in FIG. 3.

In one embodiment, analysis component 262 imports the customized code 122 into the business system (e.g., into the ERP system). This is indicated by block 284 in FIG. 3. Analysis component 262 then accesses the best practices and other criteria or rules and performs the analysis on the customized code 122, and the analyzed data is collected using collector 266. Collecting the data from the analysis is indicated by block 286 in FIG. 3.

Report generator 116 illustratively has intermittent access to analyzed data (or code analysis data 204) output by analyzed data collector 266. Therefore, report generator 116 can generate and intermittently update and display user report 126 in a given format, based upon the collected data. Report generator 116 can also filter the data presented in report 126 based upon the persona that is viewing the report. As briefly described above, different consumers of the report may find different information helpful. Therefore, when user 108 submits customized code 122, user 108 also illustratively identifies the various personnel who will be reviewing the report (such as by identifying their roles). Report generator 116 can generate various views of the analyzed data that are filtered based on the role of the intended consumer of the report. Generating and displaying the report and filtering it based on the roles of the people viewing the report is indicated by block 288 in FIG. 3.

The report can be output in different formats, such as HTML, as indicated by block 290, in spreadsheet format as indicated by block 292, in word processing format as indicated by block 294, or in other formats. In addition, report generator 116 illustratively tags the line items in the report based on the role of the intended consumers. For instance, report generator 116 can tag items that are to be viewed by managers, and those that are to be viewed by developers. When the report is rendered, either by report generator 116 or by a rendering component or user interface component on user device 134, the report is rendered, taking into account those roles. Tagging the line items is indicated by block 296 in FIG. 3. Generating the report in other ways is indicated by block 298.

The report can be displayed intermittently, as the analyzed data is still being collected. This is indicated by block 300 in FIG. 3. Analyzer instance 112 then determines whether the analysis is complete. This is indicated by block 302. If not, processing reverts back to block 286 where additional analysis data is collected. However, if the analysis is complete, then analysis instance 112 stores the information used in the various reports in analyzed data store 118 where the reports can be generated and viewed or downloaded. This is indicated by block 304 in FIG. 3.

If user 108 or business system R & D team 140 desires to view reports 126 or 146, respectively, then they are simply displayed as UI displays 132 or 142 to user 108 or business system R & D team 140, respectively. This is indicated by block 306 in FIG. 3.

If user 108 or business system R & D team 140 elects to download the report, then the respective report is downloaded to device 134 or 144, respectively. This is indicated by block 308 in FIG. 3.

Figure 3C:
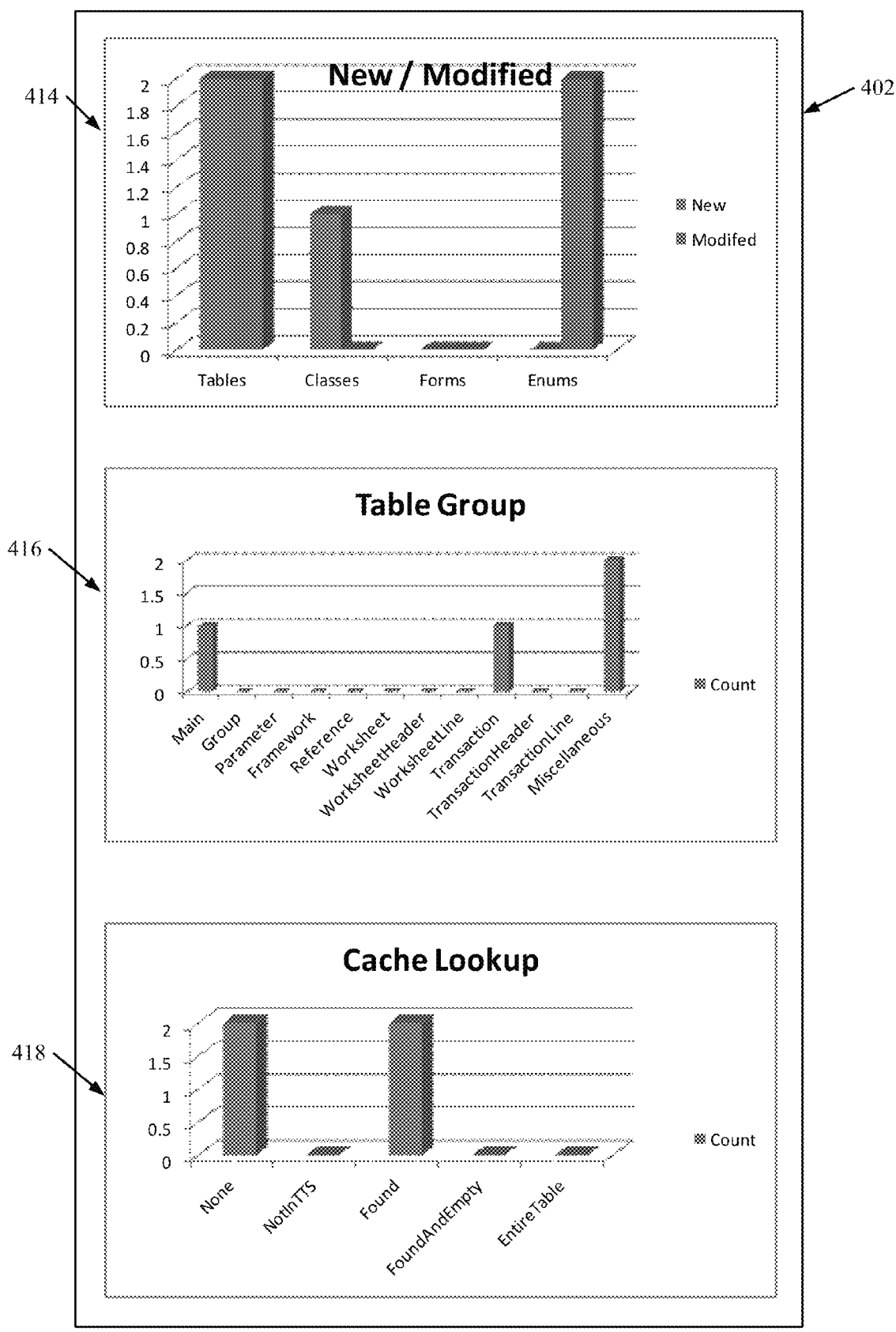
Figure 3D:
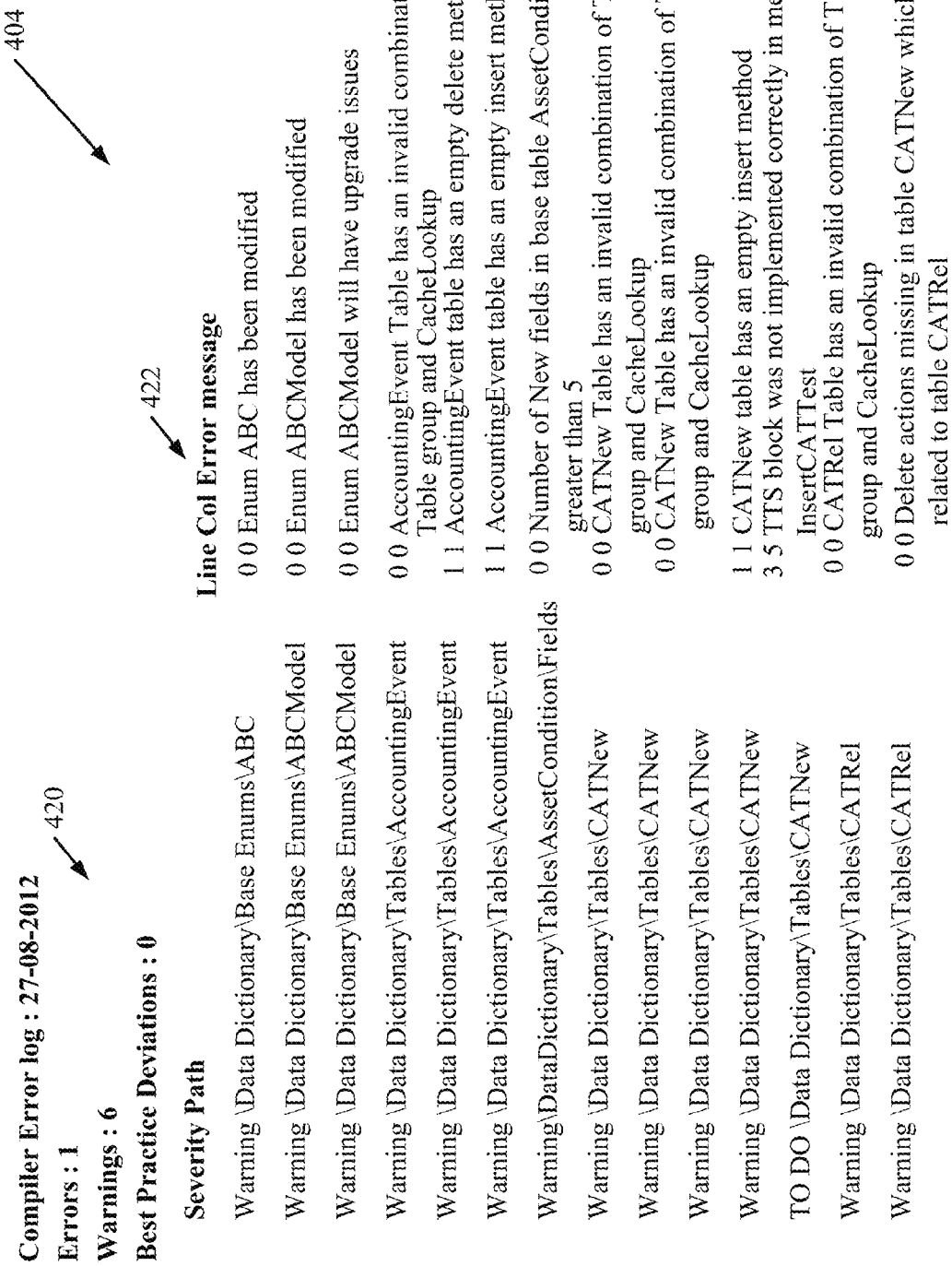

FIGS. 3B, 3C, and 3D are illustrative user interface displays showing various examples of user report 126. FIG. 3B shows a user interface display 400 that illustrates report 126 in spreadsheet format. FIG. 3C shows user interface display 402 that illustrates report 126 in graphical form, and FIG. 3D shows an HTML report that may be especially helpful for a developer. It can be seen that user interface display 400 includes a summary table 410 that shows how the customized code preformed, given various metrics. User interface display 400 also includes an object analysis section 412 that shows a breakdown of the analysis based on the different objects in the customized code, such as tables, classes, forms and enumerations. Each of the breakdown tables includes the number of objects modified, the number of new objects added, the number of warnings and the number of errors corresponding to a given type of object.

User interface display 402 shows some of the same information in graphical form. The new/modified graph 414 shows the number of objects (by object type) which are new or modified. The table group graph 416 shows the number of tables, by table group, that are in the customized code. The cache look up graph 418 shows the results of cache look up operations performed against each table.

User interface display 404 shows information that is presented, in an actionable way, and may be helpful to a developer. User interface display 404 includes a summary section 420 that summarizes the number of errors, warnings and best practice deviations. Of course, the summary section will change based upon the particular analysis criteria or rules that are being used. User interface display 404 also includes a detail section 420 that shows where the particular errors, warnings, or best practice deviations occurred and the error message corresponding to the error, warning or best practice deviation.

In one embodiment, each of the line items in section 420 is illustratively a user actuatable link. The report can be imported into the customized code of the business data system (e.g., the ERP system). Therefore, when the user actuates the link in section 420, the user is navigated to the particular object that generated the error, warning, or best practice deviation. Therefore, the developer can quickly and easily find the source of the problem and fix the problem. This is now described in greater detail with respect to FIG. 4.

Figure 4:
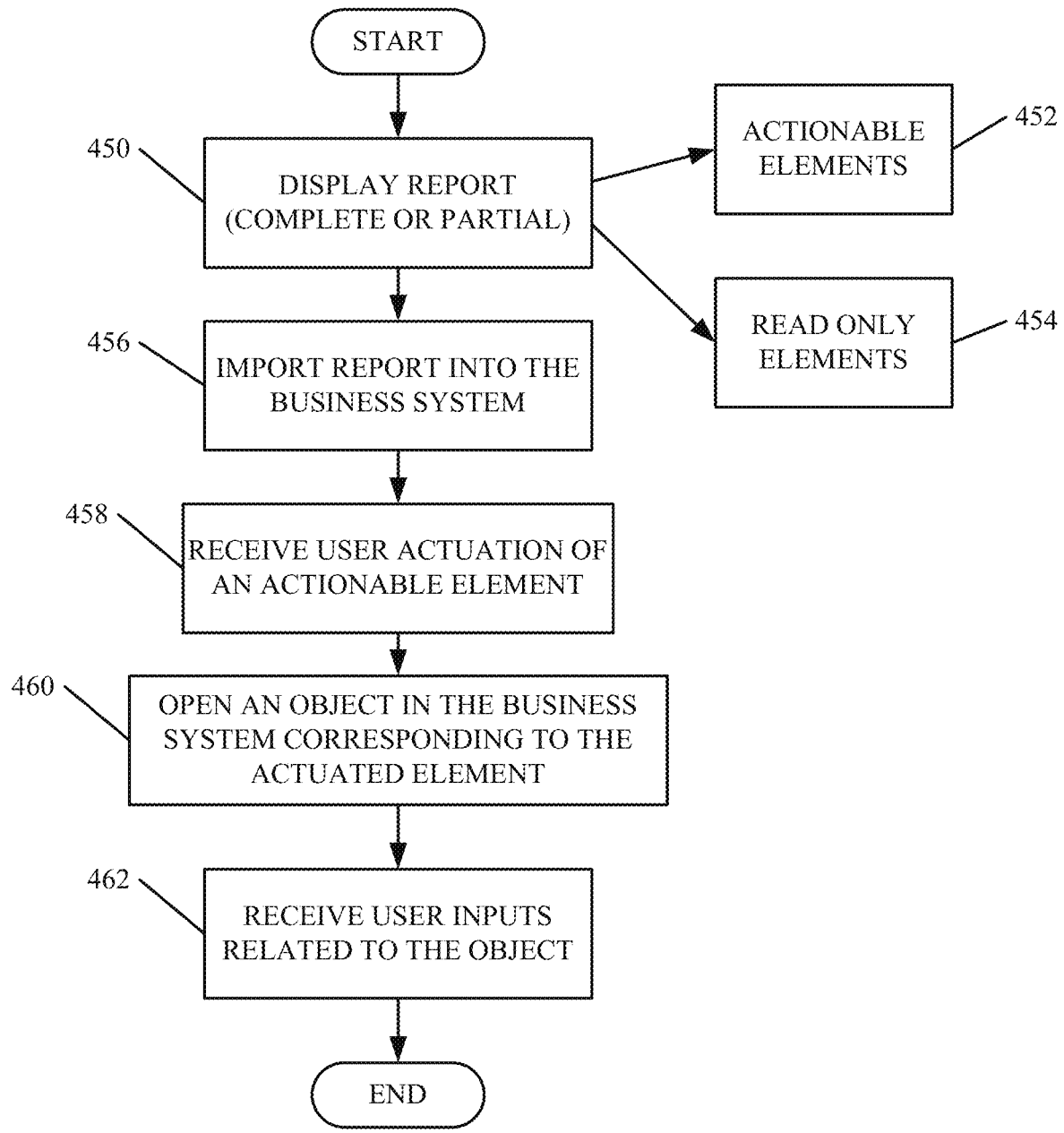
FIG. 4 is a flow diagram illustrating one embodiment of the operation of the system shown in FIG. 1 when a user actuates an actuable element within a report.

FIG. 4 is a flow diagram illustrating one embodiment of the operation of the business data system 102 in handing actionable reports. In one embodiment, the user report 126 is first displayed to user 108 as one of user interface displays 132. This is indicated by block 450 in FIG. 4. The report, as discussed above, can have actionable elements 452 or read only elements 454. If it has actionable elements (such as links in section 420 of the report shown in FIG. 3D) then it can illustratively be imported into the business system (e.g., the ERP system). For instance, user 108 can import it into the client business data system 136 on user device 134, or where user 108 is accessing the business data system 102 remotely, user 108 can import the report into business data system 102. In either case, importing the report 126 into the business data system is indicated by block 456 in FIG. 4.

In one embodiment, the report 126 is imported into a development environment in which user 108 can edit the customized code 122. The user 108 can then actuate one of the actionable elements in the report. Receiving user actuation of an actuable element is indicated by block 458 in FIG. 4. This can be done in a wide variety of different ways. For instance, where the actionable element is a hyperlink to an object in the customized code, the user can simply click or double click on the hyperlink. Similarly, the user can select and activate the actionable element in other ways as well.

In any case, once the user has actuated the actionable element, the business data system opens an object that corresponds to the actuated element. This is indicated by block 460 in FIG. 4. For instance, if the user actuates one of the links in detail section 420 of the report shown in FIG. 3D, the business data system, into which the report was imported, opens the corresponding object that generated the error message.

The business data system 102 illustratively opens the object in a development environment so that the user 108 can modify the object, as desired. Receiving user inputs related to the object, in order to overcome or address the error indicated by the actionable element, is indicated by block 462 in FIG. 4.

Figure 5:
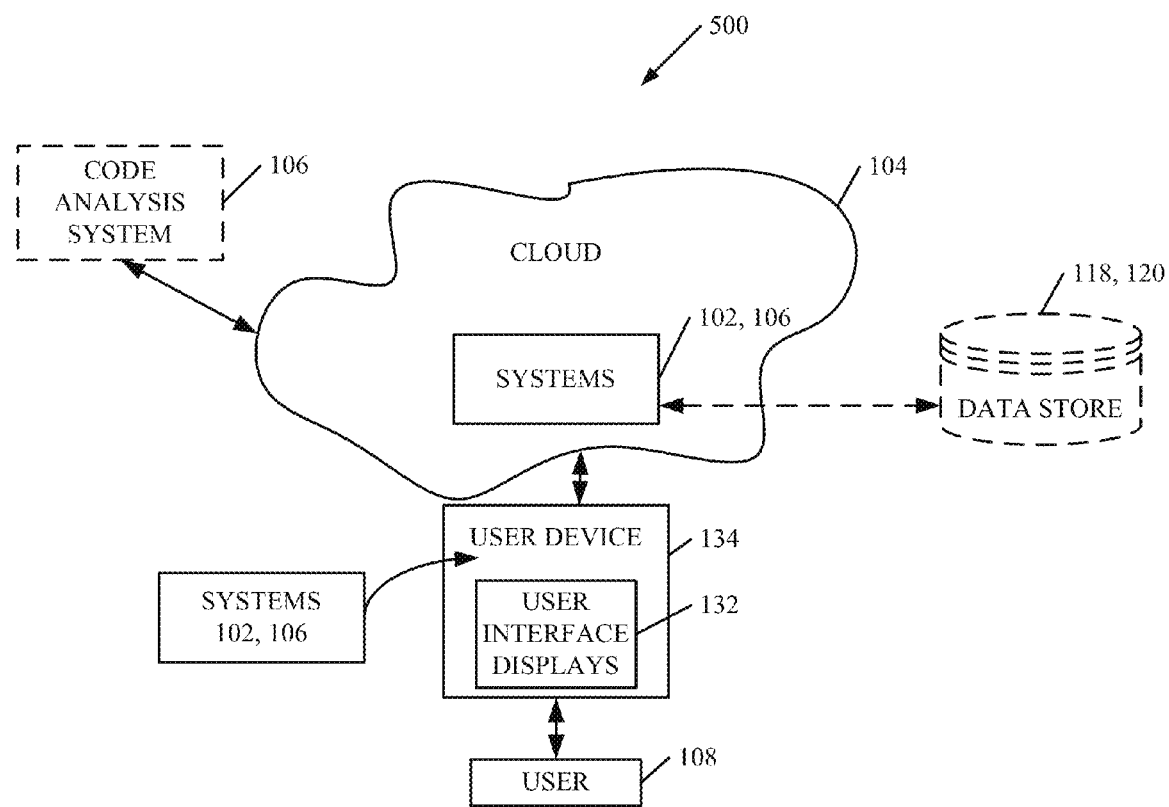
FIG. 5 is a block diagram of the system shown in FIG. 1 in various other architectures.

FIG. 5 is a block diagram of system 100, shown in FIG. 1, except that it is disposed in different architectures relative to cloud computing architecture 104. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that code analysis system 106 is located in cloud 104 (which can be public, private, or a combination where portions are public while others are private). Therefore, user 108 uses a user device 134 to access those systems through cloud 104.

FIG. 5 also depicts another embodiment of a cloud architecture. FIG. 5 shows that it is also contemplated that some elements of system 106 are disposed in cloud 104 while others are not. By way of example, data stores 118 or 120 can be disposed outside of cloud 104, and accessed through cloud 104. In another embodiment, analyzer instances 112-114 or report generator 116 are also outside of cloud 104. Regardless of where they are located, they can be accessed directly by device 134, through a network (either a wide area network or a local area network), they can be hosted at a remote site by a service, or they can be provided as a service through a cloud or accessed by a connection service that resides in the cloud. All of these architectures are contemplated herein.

It will also be noted that systems 102 and 104, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
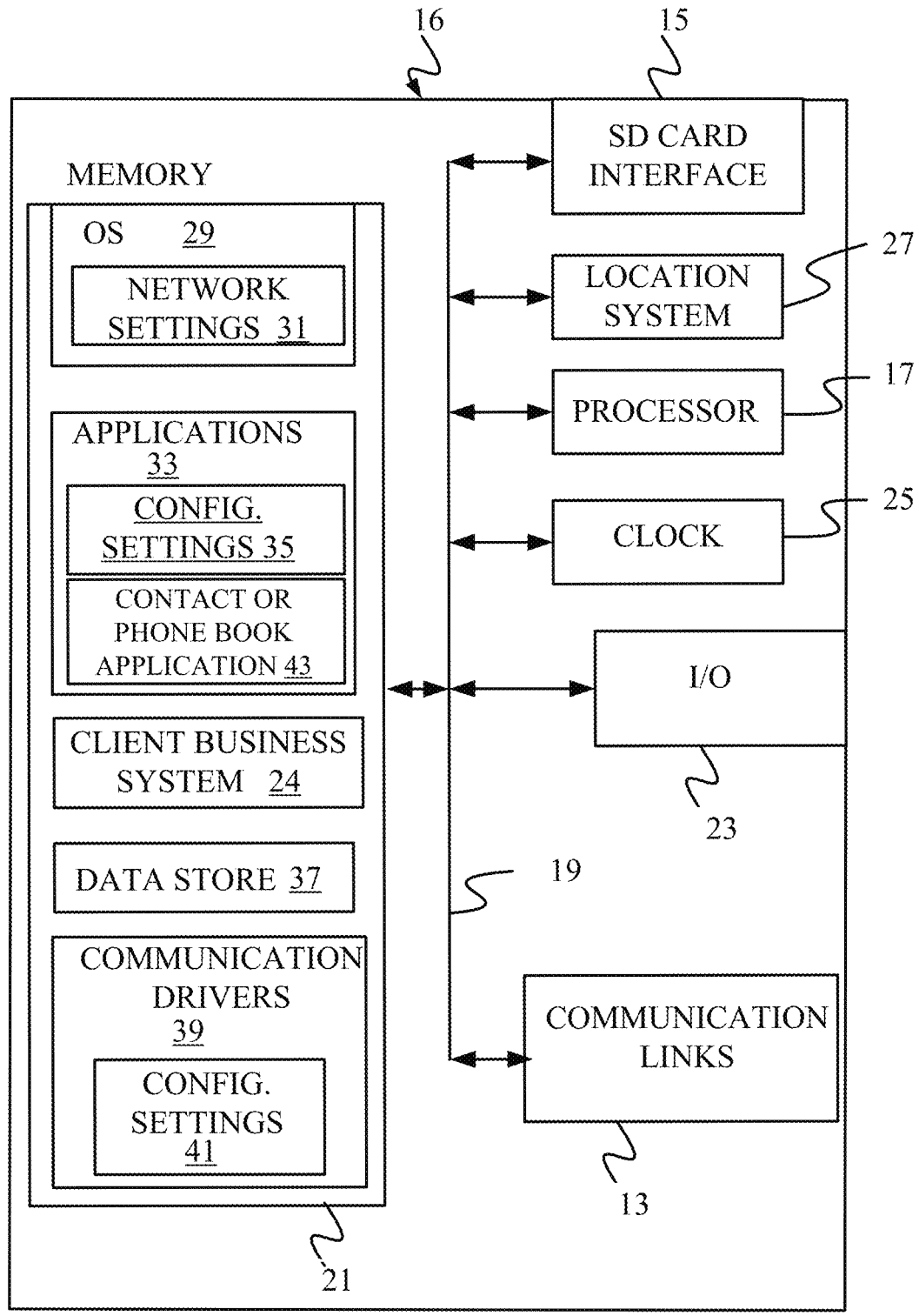
FIGS. 6-10 are embodiments of mobile devices.

FIG. 6 is a simplified block diagram of one illustrative embodiment of a handheld or mobile computing device that can be used as a user's or client's hand held device 16, in which the present system (or parts of it) can be deployed. FIGS. 7-10 are examples of handheld or mobile devices.

FIG. 6 provides a general block diagram of the components of a client device 16 that can run components of systems 102 and 106 or that interacts with systems 102 or 106, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like systems 102 or 106) are received on a removable Secure Digital (SD) card that is connected to a SD card interface 15. SD card interface 15 and communication links 13 communicate with a processor 17 (which can also embody processor 110 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 100 or the items in data stores 118 or 120, for example, can reside in memory 21. Similarly, device 16 can have a client business system 24 which can run various business applications or embody parts or all of systems 102 or 106 or both. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 7:
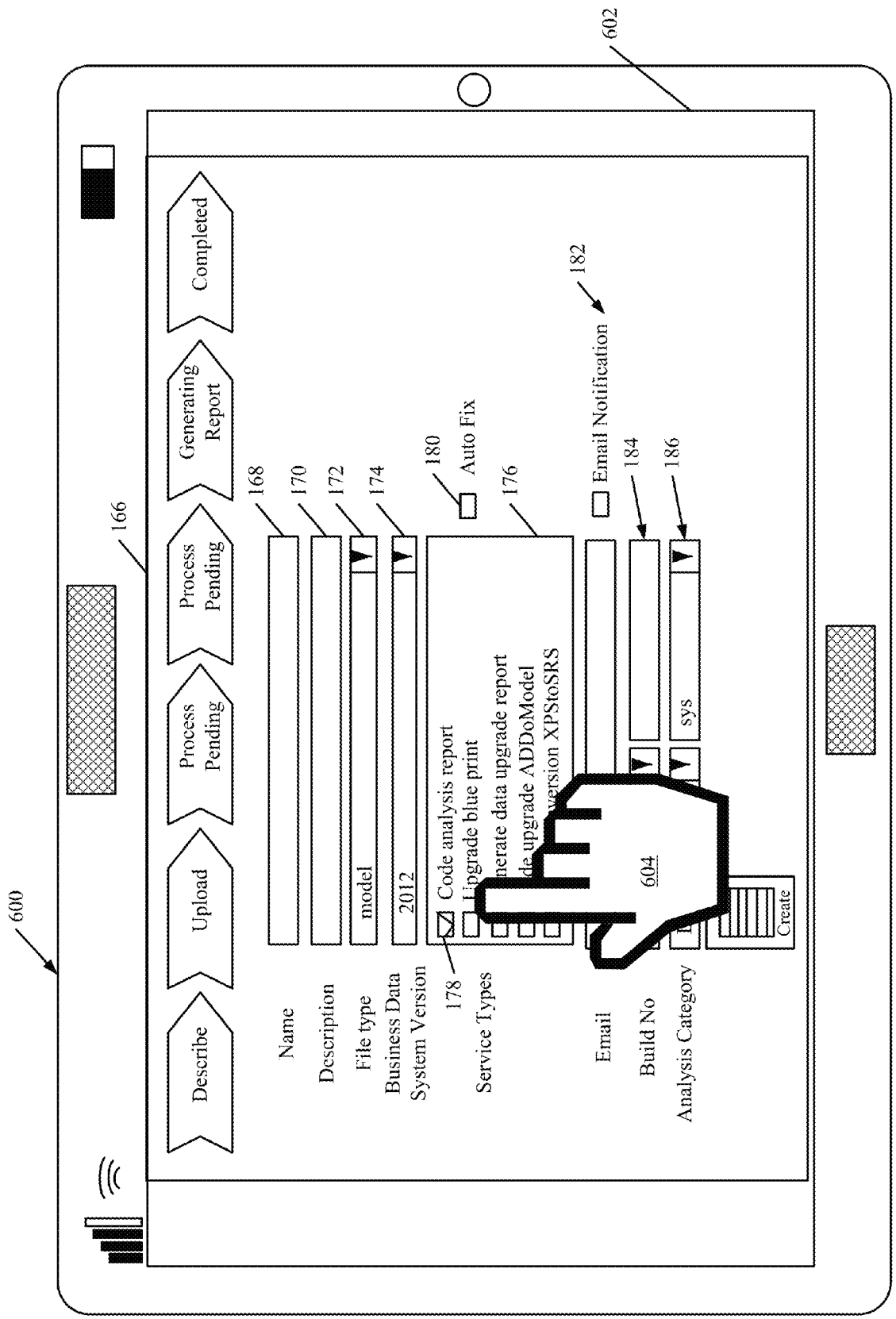
Figure 8:
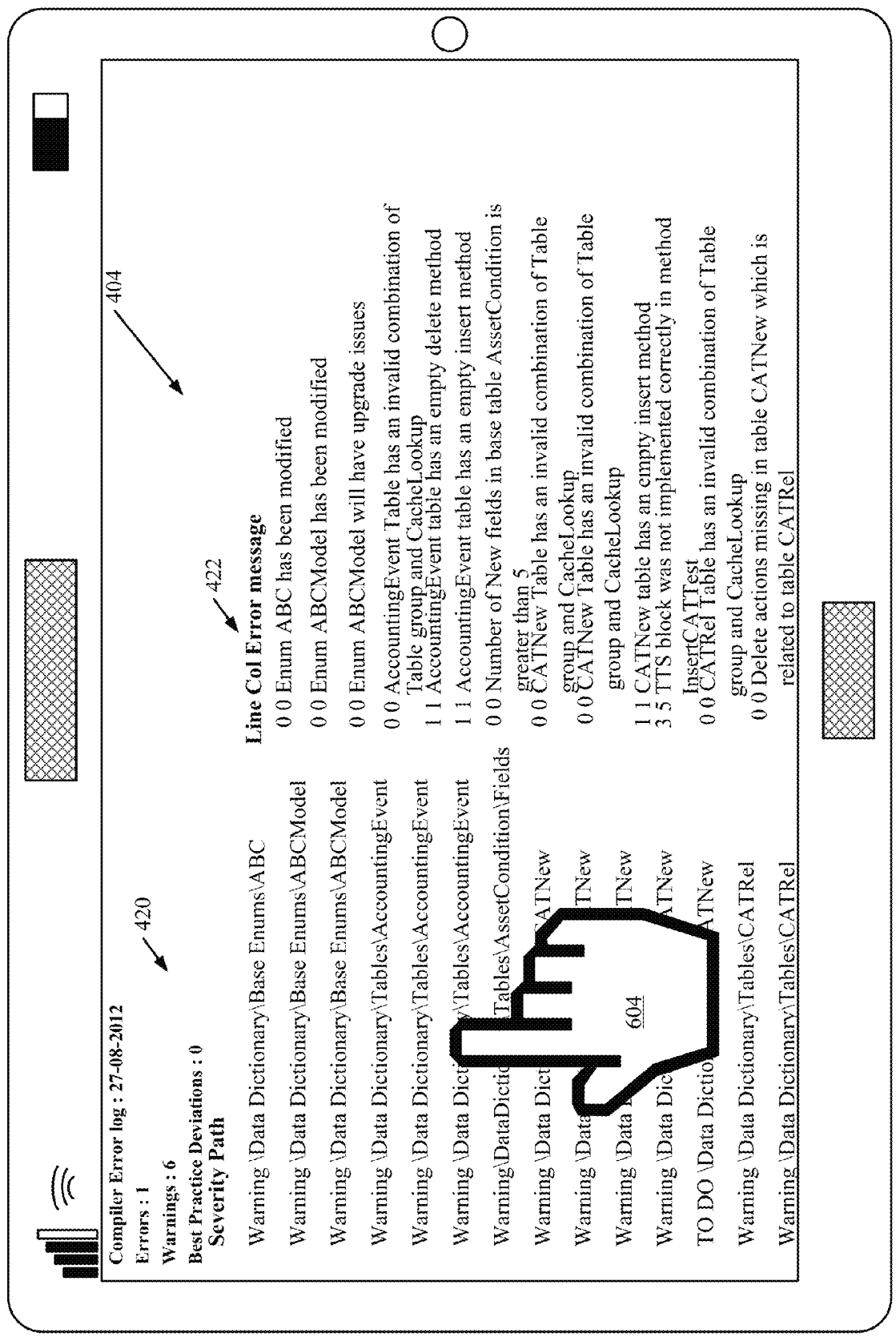

FIGS. 7 and 8 show one embodiment in which device 16 is a tablet computer 600. In FIG. 7, computer 600 is shown with user interface display 166 (used to access the web-based portal) displayed on the display screen 602. FIG. 8 shows computer 600 with user interface display 404 (used to display actionable elements) displayed on display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
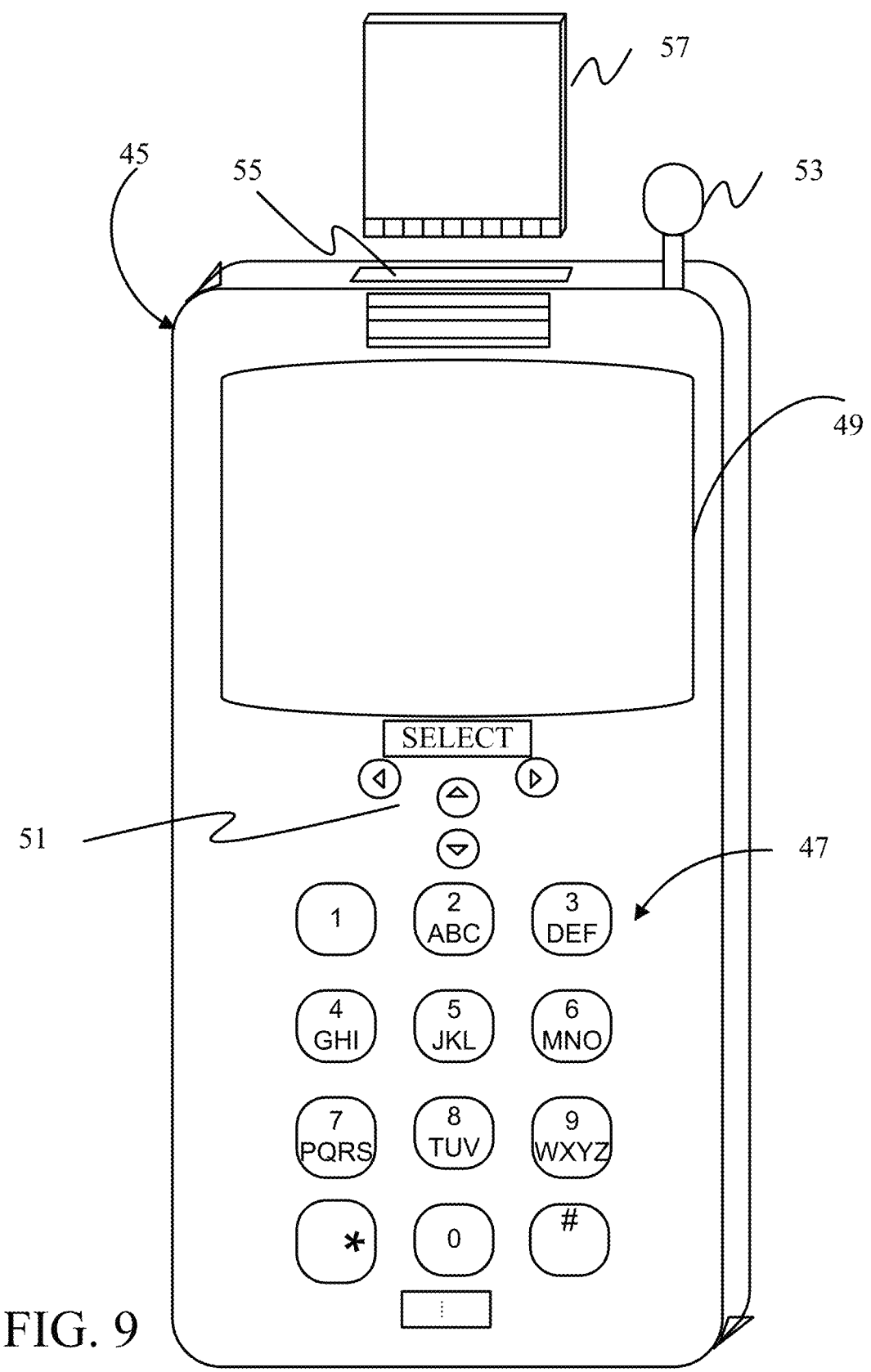
Figure 10:
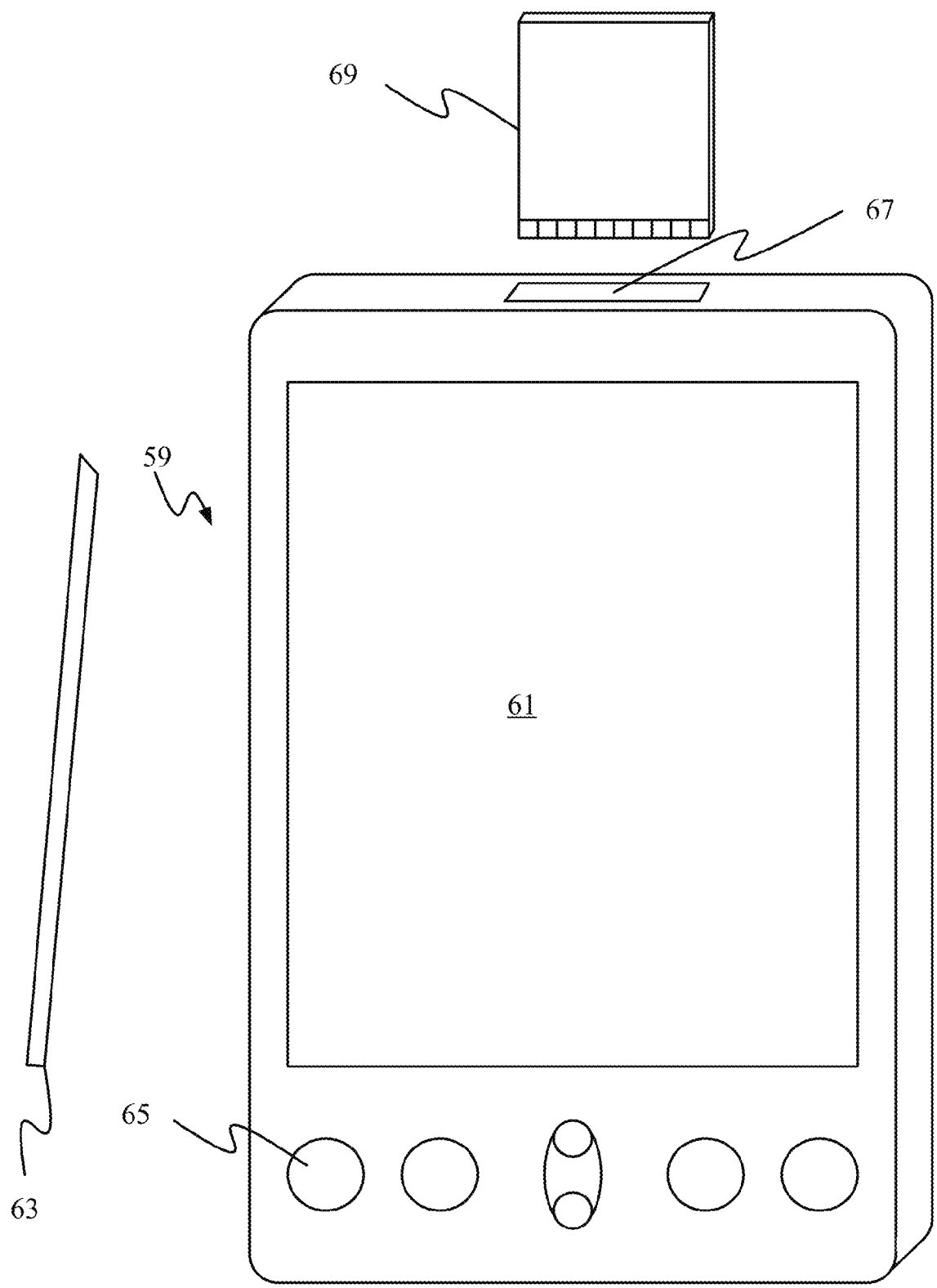

FIGS. 9 and 10 provide additional examples of devices 16 that can be used, although others can be used as well. In FIG. 9, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1×rtt, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible.

Figure 11:
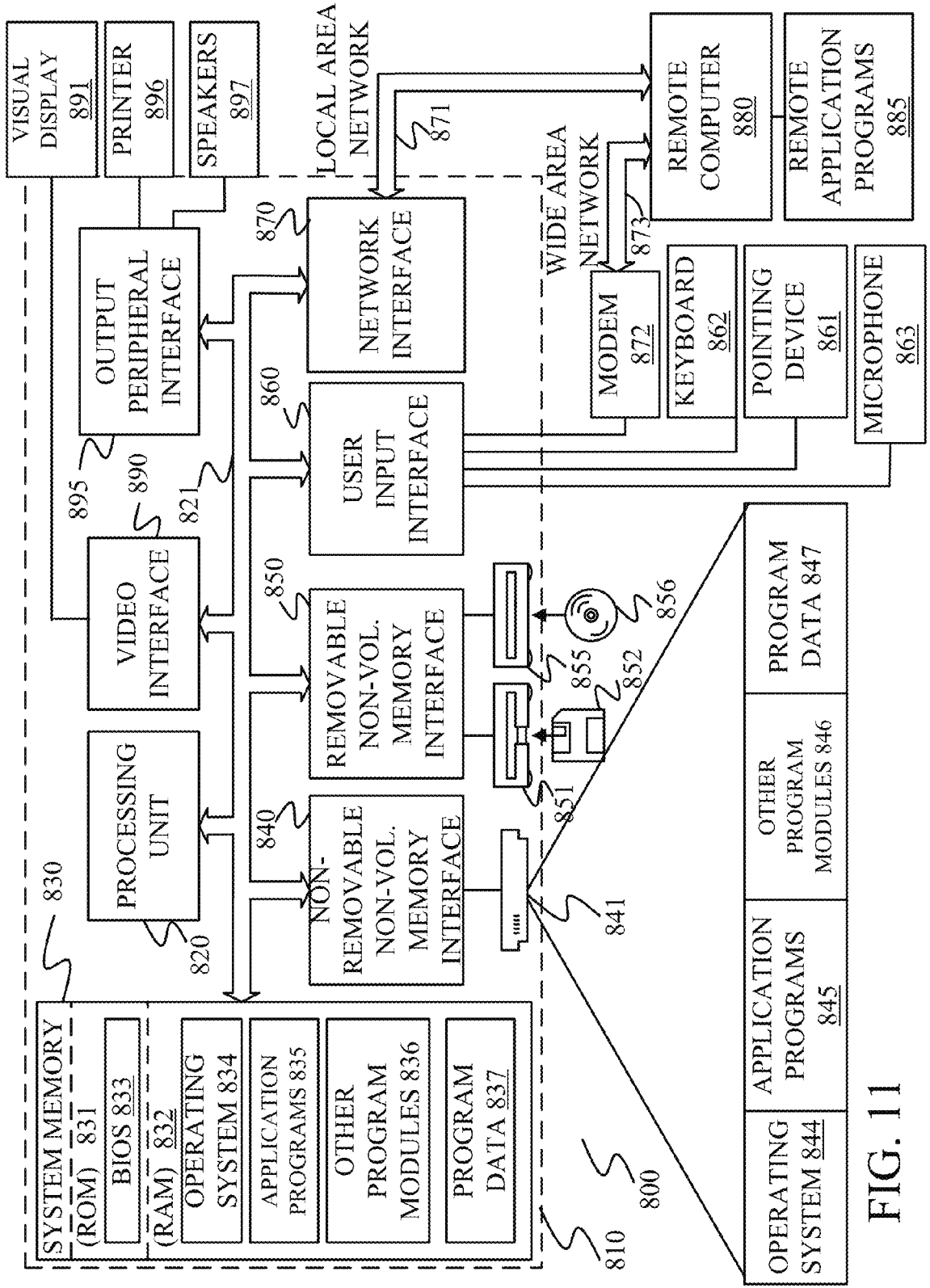
FIG. 11 is a block diagram of one embodiment of a computing environment.

FIG. 11 is one embodiment of a computing environment in which system 102 or 106 (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 110 a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    displaying a portal that provides service user put mechanisms that receive service request user inputs indicating services to be performed on customized code for a business data system and that provides a mechanism that receives, the customized code;
    displaying a results indicator, at the portal, indicating that analysis results are available through the portal;
    displaying the analysis results, through the portal, indicative of services performed on the customized code for the business data system, wherein displaying the analysis results comprises displaying an actionable element that indicates an error in the customized code;
    receiving user actuation of the actionable element;
    in response to the user actuation of the actionable element, displaying an object in the customized code, that caused the error, in a development environment in which the object is editable; and
    receiving user inputs that edit the object using the development environment.

2. The computer-implemented method of claim 1 wherein displaying the analysis results comprises:
    displaying results of a best practices analysis performed on the customized code.

3. The computer implemented method of claim 1 wherein displaying the analysis results comprises:
    displaying suggested fixes to the customized code based on the lysis performed on the customized code.

4. The computer-implemented method of claim 1 wherein displaying the analysis results comprises:
    displaying suggested upgrades the customized code based on the analysis performed on the customized code.

5. The computer-implemented method of claim 1, further comprising:
    displaying a user interface display on the portal showing aggregated customization results indicative of how a plurality of different users of the business data system customized metadata for the business data system;
    displaying, on the user interface display, aggregated analysis results indicative of analysis results of analysis performed on a plurality of different sets of customized metadata submitted by a plurality of different users; and
    receiving updates to the business data system through the portal.

6. The computer-implemented method of claim 5 wherein displaying aggregated analysis results comprises:
    displaying the aggregated analysis results for a best practices analysis performed on the plurality of different sets of customized metadata.

7. The computer-implemented method of claim 5 and further comprising:
    displaying a user information display including an identification of a type of user that customized each set of the customized metadata.

8. The computer-implemented method of claim 1, further comprising:
    displaying an upload user interface display, that provides the portal, with an upload user input mechanism that receives the customized code to be uploaded and analyzed, wherein the customized code comprises customized metadata for the business data system;
    receiving a user report through the portal, the user report reporting the analysis results of a web-based analysis of the customized code, wherein receiving the user report through the portal comprises intermittently receiving partial reports reflecting a partial analysis of the customized metadata; and
    displaying the user report.

9. The computer-implemented method of claim 8, and further comprising:
    displaying a requested services user input mechanism; and
    receiving a service request through the requested services user input mechanism, and wherein the user report reports analysis results of analysis of the customized metadata based on the service request.

10. The computer-implemented method of claim 9 wherein receiving the user report comprises:
    receiving the user report that includes report elements that report the analysis results as corresponding to objects in the customized metadata.

11. The computer-implemented method of claim 10 wherein displaying the report comprises:
    displaying the report elements as actionable elements that are user-ac actuable.

12. The computer-implemented method of claim 11 and further comprising:
    receiving user actuation of a given actionable element in the user report; and
    displaying an object corresponding to the given actionable element.

13. The computer-implemented method of claim 12 wherein displaying the report comprises:
    displaying a status user interface display, showing a status of the requested services relative to the customized metadata.

14. The computer-implemented method of claim 9 wherein the analysis results are marked with filter markers, and wherein displaying the user report comprises:
    displaying one of a plurality of different views of the user report based on the filter markers.

15. The computer-implemented method of claim 14 wherein the filter markers include role markers that identify analysis results to display based on a role of a report consumer.

16. The computer-implemented method of claim 15 and further comprising:
    receiving a role user input identifying the role of the report consumer.

* * * * *